April 2, 1946.        R. S. BRESCKA        2,397,836
COOKER
Filed March 7, 1944        2 Sheets-Sheet 1
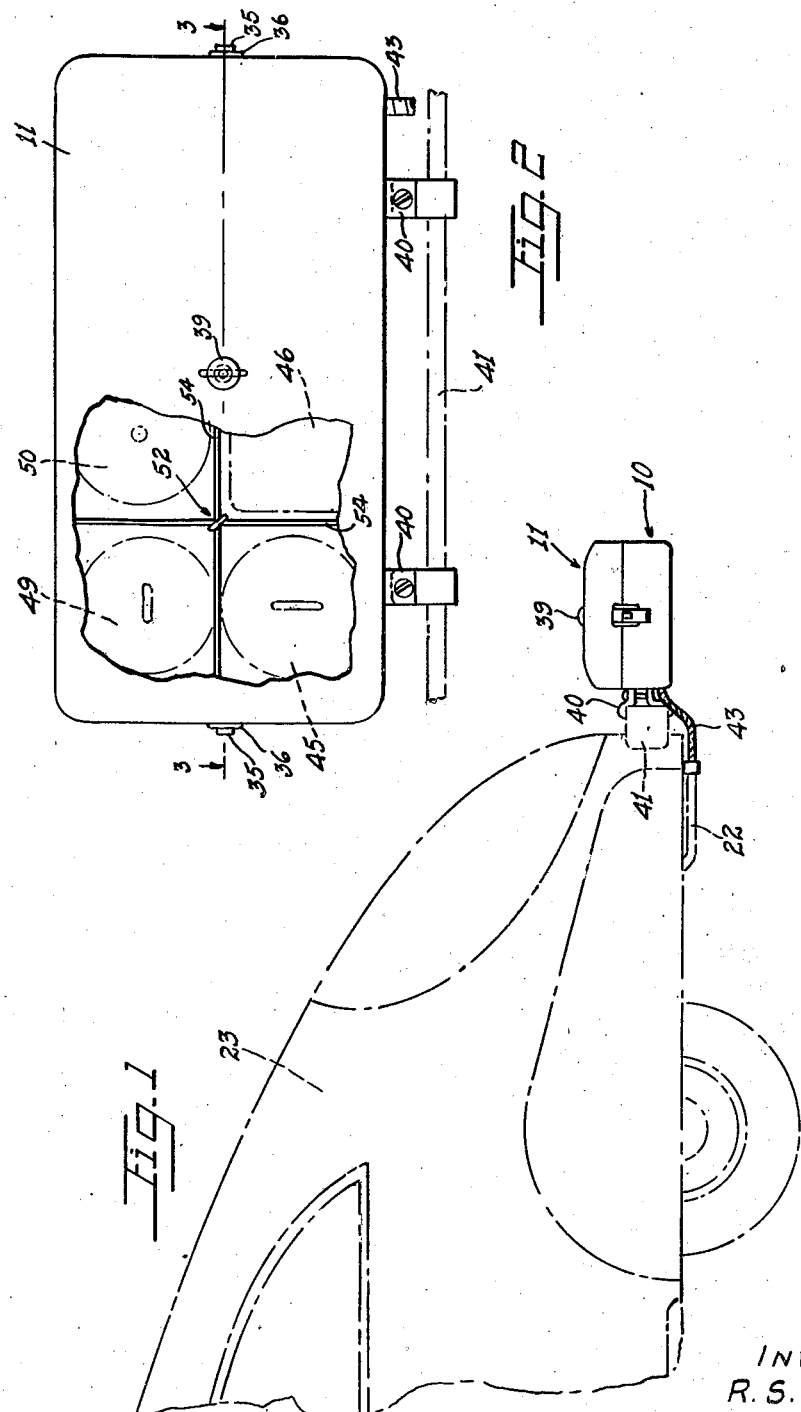
INVENTOR
R. S. BRESCKA
By W. A. Johnson
ATTORNEY

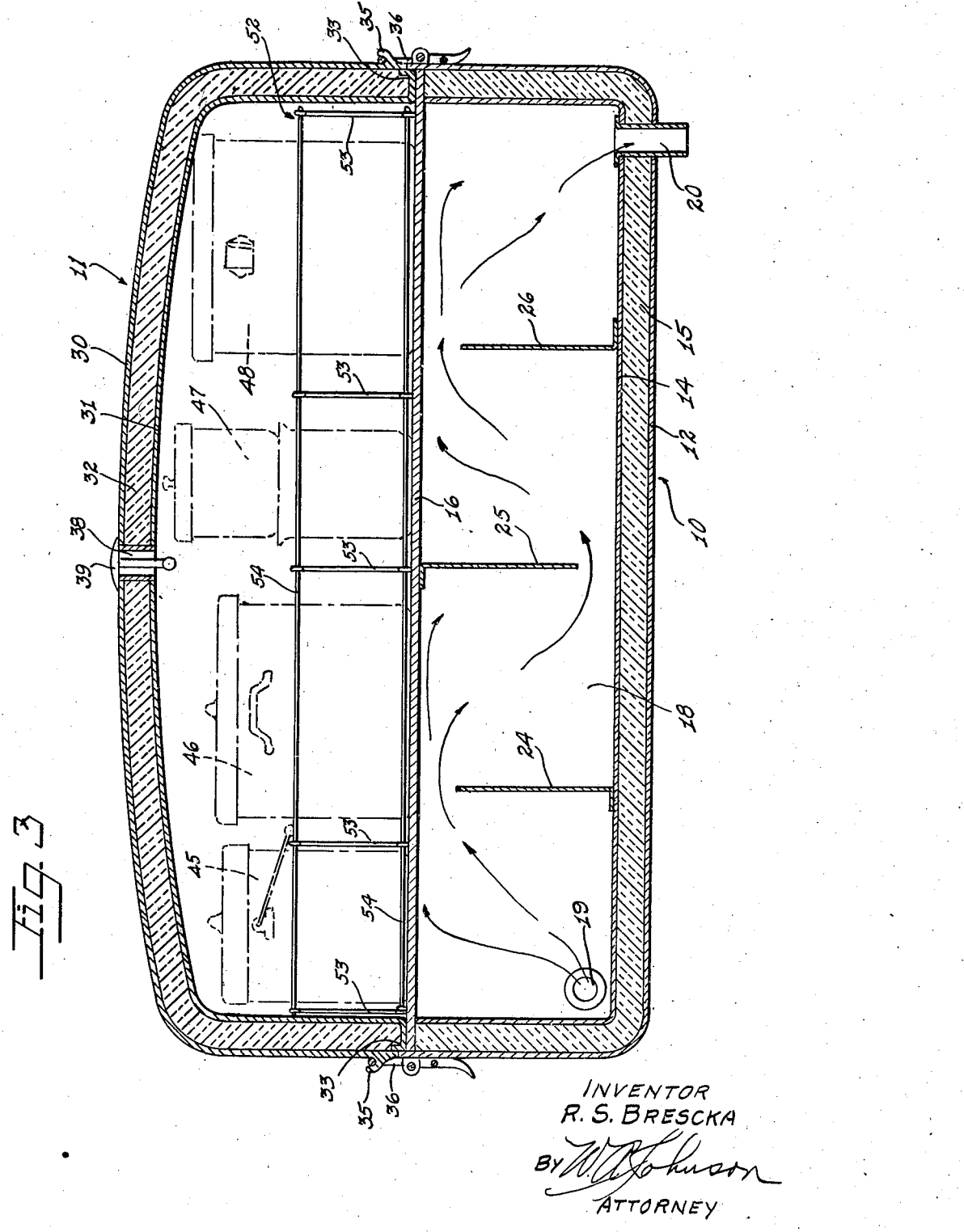

Patented Apr. 2, 1946

2,397,836

UNITED STATES PATENT OFFICE 2,397,836

COOKER

Rudolph S. Brescka, Cranford, N. J.

Application March 7, 1944, Serial No. 525,455

2 Claims. (Cl. 126—19.5)

This invention relates to cookers and more particularly to fireless cookers adapted for attachment to automobiles.

An object of the invention is to provide a fireless cooker which is simple in structure, readily attachable to motor driven vehicles and heated by the exhaust gases.

With this and other objects in view, the invention comprises a hollow body having its upper end closed by a plate adapted for cooking and/or supporting cooking utensils, the housing or body having an inlet and an outlet for the circulation of heated gases therethrough, and a cover adapted to be attached thereto.

Other objects and advantages will be apparent from the following detailed description when considered in conjunction with the accompanying drawings wherein:

Fig. 1 is an end elevational view of the cooker shown attached to an automobile;

Fig. 2 is a top plan view of the cooker, a portion of the cover being broken away, and Fig. 3 is an enlarged sectional view being taken along the line 3—3 of Fig. 2.

Referring now to the drawings the cooker is composed of two main parts, namely, a body portion indicated generally at 10 and a cover indicated generally at 11. The body 10 is hollow and includes an outer shell 12, an inner shell 14 and an intermediate portion 15 of suitable insulating material. The shells 12 and 14 are formed of sheet metal of the contours shown, their upper edges lying in different planes. A plate 16 which may be termed a hot-plate, closes the upper end of the body 10, its edges resting within the shell 12 and upon the upper edges of the shell 14 and secured in place by suitable means such as welding.

A compartment 18 in the body 10 is provided with an inlet 19 at one end thereof and an outlet 20 at the opposite end thereof, for the circulation of a heated fluid through the housing or the compartment thereof. In the present instance the heated fluid is composed of exhaust gases from an exhaust pipe 22 of a vehicle such as an automobile 23 which is driven by an internal combustion engine (not shown). Baffles 24, 25 and 26 are disposed in the compartment 18 to direct the travel of the heated fluid or gases through the compartment between the inlet and outlet. The baffles 24 and 26 extend the full width of the compartment and are secured, by suitable means such as welding, to the shell 14, while the baffle 25 extends the full width of the compartment 18 and is secured in a similar manner to the plate 16.

The cover 11 is similar in structure to the body 10 in that it is composed of an outer metallic shell 30, an inner metallic shell 31 and an intermediate body of insulating material 32. In the present embodiment the inner shell 31 is bent outwardly and upwardly as indicated at 33 to close the lower edge of the cover around the insulating material 32. The upwardly bent portion of this structure is secured by suitable means, such as welding, to the edge portion of the outer shell 30, providing a recess to receive the upwardly projecting edge of the outer shell 12 of the body 10. Furthermore, the portion 33, that is, the horizontal part thereof, rests upon the plate 16 when the cover is in the closed position shown forming an inter-fitting connection between the cover and the body. Integral lugs 35 or portions fixed to the outer shell 30 of the cover 11 are adapted for cooperation with latches 36 mounted upon the outer shell 12 of the body 10 for removably locking the cover in place. Suitable means is provided for allowing the escapement of vapors from the interior of the cover. This means includes a vent or outlet 38 which is normally closed by a valve 39, the latter being movable by a given pressure within the cover resulting from vapors escaping from articles being cooked within the cover.

Suitable brackets 40 fixed to the body 10 provide means for mounting the body at any desired position, for example, on the rear bumper 41 of the automobile 23. A flexible tubing 43 connects the inlet 19 with the exhaust pipe 22.

In the present illustration utensils 45, 46, 47, 48, 49 and 50 are shown disposed in their respective positions on the plate 16 within the cover 11. These utensils, and their relative positions, are merely illustrative of the various types which may be used for cooking food or the like. With this structure it is possible to cook food while traveling, the cover providing an insulated sealed compartment for the various containers or utensils to utilize the heat transferred thereto through the plate 16. Furthermore, means is provided to hold the various utensils against displacement and in their respective positions. This means includes a basket structure 52 formed of wire with vertical portions 53 and lateral portions 54 interconnected with each other to provide individual portions for each container.

It has been described how, with the cover 11 locked in closed position various articles may be cooked while traveling. It should be understood that the same may be accomplished at other times, it being necessary however for the motor of the vehicle to continue to run to supply the heated gases to the chamber 18. If desired, the plate 16 may be used alone for frying or otherwise cooking materials without the aid of the cover 11. The upwardly projecting edge of the outer shell 12 will retain suitable greases necessary for frying foods. The term "cooking" has been used in general, but it should be understood that it is to include not only the boiling, stewing or otherwise processing foods for eating but it is to include the boiling of water, the brewing of coffee, etc.

The cooker, therefore, includes a body formed of the interfitting metallic shells with the intermediate heat insulating material, providing a compartment connected at the inlet with the exhaust pipe of the motor driven vehicle for the passage of the exhaust or heated gases in the guided path through the chamber and through the exhaust port thereof. The plate 16 thus becomes heated and, as heretofore described, may be employed for the cooking of foodstuffs directly thereon, or for supporting desired numbers of the utensils as illustrated. The insulated cover rests upon the plate 16 and is nested in the body to form an interfitting seal therebetween which is maintained through the aid of the latches.

Although specific improvements of the invention have been shown and described it will be understood that they are but illustrative and that various modifications may be made therein without departing from the scope and spirit of this invention as defined by the appended claims.

What is claimed is:

1. A cooker adapted for attachment to a motor driven vehicle having a pipe for exhausting gases from the motor thereof, the cooker comprising a hollow body formed of an outer casing having an open top and spaced apertures therein, an inner casing disposed in the outer casing and having spaced apertures therein aligning with the apertures of the outer casing and also having its open upper end terminating below the open upper end of the outer casing, an insulating material interposed between the casings, a metallic plate closing the open upper ends of the casings by being disposed upon the open end of the inner casing and having its edges engaging the inner surfaces of the outer casing below the upper edge thereof, a tubular outlet element extending through one set of the aligned apertures of the casings and the adjacent insulating material, a tubular inlet element extending through the other set of aligned apertures of the casings and the adjacent insulating material, means to connect the inlet element to the said pipe to cause the said gases to travel through the body to thereby heat the plate, and a hollow cover formed of an outer shell having its open lower end of a contour whereby it may rest on the projecting upper edge of the outer casing, an inner shell disposed within the outer shell and having its edge portion formed outwardly to rest upon the plate and close space between the shells at the lower open end of the cover, and an insulating material interposed between the shells to retain heat from the plate within the cover.

2. A cooker adapted for attachment to a motor driven vehicle having a pipe for exhausting gases from the motor thereof, the cooker comprising a hollow body formed of an outer casing having an open top and spaced apertures therein, an inner casing disposed in the outer casing and having spaced apertures therein aligning with the apertures of the outer casing and also having its open upper end terminating below the open upper end of the outer casing, an insulating material interposed between the casings, a metallic plate closing the open upper ends of the casings by being disposed upon the open end of the inner casing and having its edges engaging the inner surfaces of the outer casing below the upper edge thereof, a tubular outlet element extending through one set of the aligned apertures of the casings and the adjacent insulating material, a tubular inlet element extending through the other set of aligned apertures of the casings and the adjacent insulating material, means to connect the inlet element to the said pipe to cause the said gases to travel through the body to thereby heat the plate, a hollow cover formed of an outer shell having its open lower end of a contour whereby it may rest on the projecting upper edge of the outer casing, an inner shell disposed within the outer shell and having its edge portion formed outwardly to rest upon the plate and close space between the shells at the lower open end of the cover, an insulating material interposed between the shells to retain heat from the plate within the cover, releasable elements to secure the cover to the body, and means removably disposed on the plate and receivable in the cover to hold articles at selected spaced positions.

RUDOLPH S. BRESCKA.